UNITED STATES PATENT OFFICE.

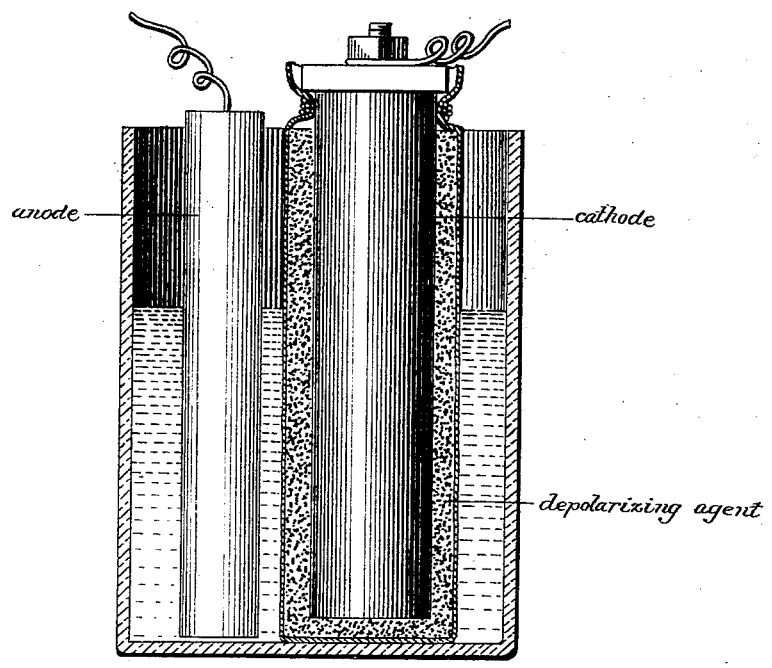

ALBRECHT HEIL, OF FRANKFORT-ON-THE-MAIN, GERMANY, ASSIGNOR TO COLUMBUS, ELECTRICITÄTS-GESELLSCHAFT MIT BESCHRÄNKTER HAFTUNG, OF LUDWIGSHAFEN, GERMANY.

GALVANIC BATTERY.

SPECIFICATION forming part of Letters Patent No. 653,770, dated July 17, 1900.

Application filed April 9, 1900. Serial No. 12,237. (No model.)

*To all whom it may concern:*

Be it known that I, ALBRECHT HEIL, a subject of the Emperor of Germany, and a resident of Frankfort-on-the-Main, Germany, have invented certain new and useful Improvements in Galvanic Batteries, of which the following is a specification.

The object of this invention is to provide an electric cell or battery of constancy as great as that of Meidinger, from which, however, the improved cell or battery, according to this invention, differs in presenting very slight internal resistance and also in being capable of being used as a "dry" cell or battery. The cell or battery to which this invention relates is of the kind wherein salt of mercury in admixture with carbon is employed as a depolarizing agent.

The use of salt of mercury in electric cells or batteries, owing to the limited conducting power of the said salt, causes the internal resistance of the cell or battery to rise to a very high degree, so as to be unfit for use to yield in a permanent manner currents of any appreciable value, and to overcome this objection it has been proposed to use carbon in admixture with the salt of mercury, and certain electric cells or batteries are known wherein for the purpose of producing more powerful currents a mixture of a salt of mercury and carbon is employed—for example, Beaufils's cell and that of A. Schanschieff, described in the specification of British Letters Patent No. 6,876 of 1884. In these cells the salt used is the protosulfate of mercury, and it is mixed with graphite or plumbago held together with paraffin. A cell so formed on account of the solubility of the protosulfate of mercury and of the high degree of resistance of the electrode due to the use of paraffin will not supply constant currents of any appreciable value.

Parkhurst describes in the specification of a Patent No. 269,454, granted in the United States of America, a cell in which a salt of mercury (chlorid of mercury) is used in combination with carbon and black oxid of manganese. In this cell, however, as in the other cells in which a salt of mercury and carbon have been used, free hydrochloric acid forms and exercises an injurious action and prejudicially affects the durability of the cell. According to this invention chlorid of mercury (calomel) is employed as the salt of mercury, and the carbon may be of any suitable kind, such as finely-divided graphite or plumbago or charcoal. No other material having an electrical effect is employed in this depolarizing mixture; but there is added to it an electrically-indifferent body capable of absorbing or holding hydrochloric acid while current is being derived from the battery, the substance best suited for this purpose being finely-divided chalk, which is thoroughly mixed with the calomel and carbon. In preparing this mixture equal parts, by weight, of the carbon and of the calomel may be used and about five per cent. of the chalk be added.

In practice the cathode may be of carbon and platinum, for example, and it may be placed in a bag tied around the said cathode and filled with the aforesaid mixture, the electrolyte used being preferably a chlorid-of-zinc solution, while zinc serves as an anode.

In the accompanying drawing I have shown in sectional elevation a cell constructed as indicated.

The addition of chalk or the like to the depolarizing material has the effect of destroying the hydrochloric acid forming in the operation of the battery as a result of the reduction of the calomel without injuriously affecting the hydrogen-holding property of the calomel, which is wholly reduced to pure metal down to the stage of exhaustion of the cell, so that the internal resistance of the cell becomes lower rather than higher. Owing to the fact that the reduced calomel remains inclosed in the carbon in the condition of very finely-divided metal the cell may, similarly to an accumulator, be regenerated in a certain degree by means of current supplied from an external source. The cell being capable of being arranged as a dry cell which is durable for practical purposes is an advantage of the highest importance. The electromotive force of this cell is from 1.07 to 1.10 volts, while its internal resistance is approximately equal to that of the Leclanché cell. At a constant voltage currents sufficient for illumination or for driving small motors can be derived from this cell.

Having now particularly described and ascertained the nature of this invention and in what manner the same is to be performed, I declare that what I claim is—

A cell having an anode, a cathode, and a depolarizing agent consisting of calomel and carbon mixed with an electrically-indifferent body capable of absorbing hydrochloric acid, said mixture surrounding the cathode, substantially as described.

In testimony whereof I have signed my name to this specification in the presence of two subscribing witnesses.

ALBRECHT HEIL.

Witnesses:
FRANZ HASSLACHER,
MICHAEL VOLK.